(12) United States Patent  
Chen et al.

(10) Patent No.: US 7,897,891 B2
(45) Date of Patent: *Mar. 1, 2011

(54) LASER WELDING SYSTEM

(75) Inventors: Qiong Chen, Singapore (SG); Muay Kheng Neo, Singapore (SG); Marjan S. Amesbury, Albany, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1711 days.

This patent is subject to a terminal disclaimer.

(21) Appl. No.: 11/111,645

(22) Filed: Apr. 21, 2005

(65) Prior Publication Data

US 2006/0237129 A1    Oct. 26, 2006

(51) Int. Cl.
  *B23K 26/20*   (2006.01)
  *B29C 65/16*   (2006.01)
(52) U.S. Cl. .............................. 219/121.63; 156/272.8; 219/121.64
(58) Field of Classification Search ............ 219/121.63, 219/121.76, 121.62, 121.64; 156/272.8; 362/259, 268; 359/619; 372/50.12, 50.124
See application file for complete search history.

(56) References Cited

U.S. PATENT DOCUMENTS

| 4,185,891 | A | | 1/1980 | Kaestner |
| 4,428,647 | A | * | 1/1984 | Sprague et al. ............. 359/619 |
| 4,937,422 | A | * | 6/1990 | Nagamine et al. ...... 219/121.62 |
| 5,502,292 | A | * | 3/1996 | Pernicka et al. ........ 219/121.63 |
| 5,506,857 | A | | 4/1996 | Meinzer |
| 5,698,120 | A | * | 12/1997 | Kurosawa et al. ...... 219/121.62 |
| 5,705,788 | A | | 1/1998 | Beyer et al. |
| 5,886,313 | A | * | 3/1999 | Krause et al. ............ 219/121.6 |
| 5,987,043 | A | * | 11/1999 | Brown et al. ............. 372/50.12 |
| 6,201,210 | B1 | | 3/2001 | Sans Revellat et al. |
| 6,331,692 | B1 | * | 12/2001 | Krause et al. .......... 219/121.73 |
| 6,465,757 | B1 | * | 10/2002 | Chen ..................... 219/121.63 |
| 6,478,452 | B1 | * | 11/2002 | Richardson et al. ......... 362/268 |
| 6,486,433 | B2 | | 11/2002 | Grewell et al. |
| 6,494,371 | B1 | * | 12/2002 | Rekow et al. ................ 235/454 |
| 6,700,709 | B1 | | 3/2004 | Fermann |

(Continued)

FOREIGN PATENT DOCUMENTS

DE    4234342 A1    4/1994

(Continued)

OTHER PUBLICATIONS

German Office Action dated Feb. 21, 2008.

(Continued)

*Primary Examiner*—Geoffrey S Evans (57) ABSTRACT

A laser welding system includes a free-spacing beam delivery laser head having a linear array of at least two laser diodes, each of the diodes generating a laser beam of a predetermined wavelength and spectral width. The laser beams are adapted to weld a workpiece having a first component and at least one other component to be welded to the first component, the first component substantially transmissive to the wavelength, the other component substantially absorptive of the wavelength. A lens is spaced from the linear array, and directs the laser beams to at least one other lens spaced from the lens. The other lens shapes the laser beams to a predetermined width and length, and focuses the laser beams to substantially the same location, thereby forming a continuous line of laser energy being in a plane containing the workpiece, and being substantially orthogonal to the workpiece translation direction.

20 Claims, 4 Drawing Sheets

U.S. PATENT DOCUMENTS

| | | |
|---|---|---|
| 6,714,581 B2 | 3/2004 | Corcoran |
| 6,763,054 B2 | 7/2004 | Whitley |
| 6,773,142 B2 * | 8/2004 | Rekow .................. 362/259 |
| 7,016,393 B2 * | 3/2006 | Anikitchev et al. ......... 359/619 |
| 7,018,260 B2 * | 3/2006 | Kawamura et al. ..... 219/121.63 |
| 7,065,105 B2 * | 6/2006 | Ehlers et al. ............. 372/50.12 |
| 7,092,413 B2 * | 8/2006 | Yamazaki et al. ............. 372/33 |
| 7,257,136 B2 * | 8/2007 | Mori et al. ............. 219/121.62 |
| 7,538,295 B2 * | 5/2009 | Amesbury et al. ..... 219/121.63 |
| 2001/0020548 A1 | 9/2001 | Burgess |
| 2002/0125234 A1 * | 9/2002 | Chen et al. ............. 219/121.76 |
| 2002/0148818 A1 * | 10/2002 | Satou et al. ............. 219/121.76 |
| 2002/0166847 A1 * | 11/2002 | Lacchetti et al. ....... 219/121.63 |
| 2004/0027631 A1 | 2/2004 | Nagano et al. |
| 2004/0030384 A1 * | 2/2004 | Wissman .................. 156/272.8 |
| 2004/0065406 A1 | 4/2004 | Chen et al. |
| 2004/0136429 A1 * | 7/2004 | Krupke ........................ 372/55 |
| 2004/0174604 A1 | 9/2004 | Brown |
| 2005/0045604 A1 * | 3/2005 | Talwar et al. .......... 219/121.76 |
| 2005/0047971 A1 | 3/2005 | Clements et al. |
| 2005/0217790 A1 * | 10/2005 | Joachimi et al. ......... 156/272.8 |
| 2005/0254539 A1 * | 11/2005 | Klimek .................... 372/50.12 |

FOREIGN PATENT DOCUMENTS

| | | |
|---|---|---|
| EP | 0495158 | 7/1992 |
| EP | 0997261 | 5/2000 |
| JP | 2-267093 A * | 11/1987 |
| JP | 2004-122560 A * | 4/2004 |
| WO | 00/66345 | 11/2000 |

OTHER PUBLICATIONS

U.S. Appl. No. 11/111,540, Amesbury, et al., Filed Apr. 21, 2005: Aug. 22, 2008 Office Action and Sep. 17, 2008 Response.

* cited by examiner

LASER WELDING SYSTEM

BACKGROUND

The present disclosure relates generally to laser welding, and more particularly to an apparatus for laser welding.

Laser welding is a fusion welding process, where materials are joined by melting or softening the interface between the parts to be joined and allowing it to solidify. An intense beam of laser radiation is focused onto the material to be joined. The radiation excites a resonant frequency in the molecules of the parts to be joined, resulting in heating of the material. The radiation produced by laser diodes may be used to weld plastic parts, but the power associated with a single laser diode may, in some instances, be insufficient to melt the material to be joined quickly and efficiently. Some laser welding devices combine the output of a number of laser diodes to produce quick heating of a large area of the material to be joined. One method for combining the laser radiation from a bank of laser diodes is to use optical fibers to transmit the laser radiation to a location to produce sufficient radiation density for welding. The flexibility of optical fibers may be advantageous in applications where welding is desired in three spatial dimensions.

The bank of lasers of one laser welding system contains 15 individual 50 Watt laser diodes for a combined power of 750 Watts. The laser diodes specified in the bank of lasers each produce continuous laser radiation at a wavelength of 808 nm with a spectral width less than 2.5 nm. The relatively tight spectral width may be advantageous when using the lasers as a bumping source for solid state lasers, however a tight spectral width generally corresponds to low energy gain efficiency in laser diodes.

Depending upon the application, there may be a relatively high cost of maintenance for both diode lasers and the optical fiber array. In a mass production environment, there may be a significant cost of down time if any of the 15 laser diodes or optical fibers requires realignment or maintenance. The mean time between maintenance (MTBM) of the system is generally shorter because of the relatively large number of components. Another drawback to an optical fiber array is the potentially high loss of energy during beam transportation through the fiber(s).

A laser welding apparatus may produce a line of sufficient laser energy density for welding by arranging segments of laser energy in an adjacent, linear array to create a substantially continuous line of laser energy with a length approximating the sum of the lengths of the individual laser segments. Welding may be relatively quickly accomplished by scanning the pieces to be welded substantially perpendicularly to the laser line. Consistent weld quality along the laser line may be accomplished by adjusting the power to each individual laser so that the laser energy absorbed by the welded parts is substantially equal for each laser line segment. However, individual control of the power to each laser diode may potentially be relatively expensive. As such, some laser welders may provide a single power control for the array of laser diodes; and in this case, if one laser drops in efficiency, it may, in some instances, not be possible to compensate by increasing the power to the array without potentially exceeding the specifications for the other laser diodes in the array. One strategy for overcoming a loss of efficiency in a laser diode may be to temporarily take the laser welder out of service and replace the less efficient laser diode.

Thus, it would be desirable to provide an apparatus for laser welding that substantially overcomes the above drawbacks by providing an apparatus that has a longer mean time between maintenance (MTBM), lower initial capital cost and more energy efficient operation.

SUMMARY

A laser welding system includes a free-spacing beam delivery laser head having a linear array of at least two laser diodes, each of the diodes adapted to generate a laser beam of a predetermined wavelength and spectral width. The laser beams are adapted to weld a workpiece having a first component and at least one other component to be welded to the first component, the first component substantially transmissive to the predetermined wavelength, the other component substantially absorptive of the predetermined wavelength. A lens is spaced a predetermined distance from the linear array, the lens being adapted to direct the laser beams to at least one other lens spaced a predetermined distance from the lens. The other lens is adapted to shape the laser beams to a predetermined width and length, and is further adapted to focus the laser beams to substantially the same location, thereby forming a continuous line of laser energy being in a plane containing the workpiece, the line being substantially orthogonal to a direction of translation of the workpiece.

BRIEF DESCRIPTION OF THE DRAWINGS

Objects, features and advantages of embodiments of the present disclosure will become apparent by reference to the following detailed description and drawings, in which like reference numerals correspond to similar, though not necessarily identical components. For the sake of brevity, reference numerals having a previously described function may not necessarily be described in connection with other drawings in which they appear.

DETAILED DESCRIPTION

It has been unexpectedly and fortuitously discovered that the laser welding system of the present disclosure has a longer mean time between maintenance (MTBM), relatively low initial capital cost, and more energy efficient operation.

A general description of the system of the present disclosure follows, while a more detailed description is further below. The total contribution of the stack of lasers (e.g. six diode lasers) may be monitored as opposed to monitoring individual laser diodes. The beams from the laser diodes are projected to substantially the same position (for example, at focal plane F to form a beam which is then shaped by an optical system to fit a predetermined dimension of a polymeric workpiece (for example, the width of the part, as well as the desired laser energy density). For example, the maximum output power of each laser diode may be 80 W, and the total output power at full current should be 480 W. In an embodiment, a lower output power (for example, 70 W) may be specified so as to potentially maximize the lifetime of the laser diode. If the laser output power starts to degrade for one laser below 80 W (or whatever the output power is), current may be adjusted to compensate for the degraded laser substantially without causing undesirable overheating of one or more areas of the workpiece. As such, the laser energy density on the workpiece surface may be advantageously maintained at substantially the same level to achieve acceptable welding quality.

Figure 1:
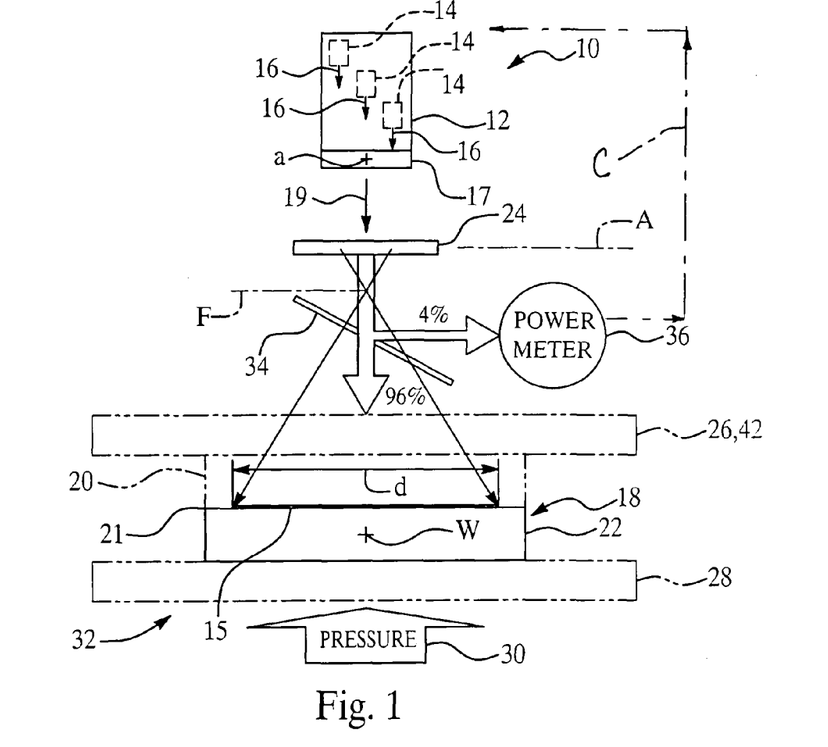
FIG. 1 is a schematic view of an embodiment of a laser welding system.

Referring now to FIG. 1, in an embodiment, a laser welding system is designated generally at 10. Laser welding system 10 includes a free-spacing beam delivery laser head 12 having a linear array of at least two laser diodes 14 therein. In an embodiment, a linear array of six laser diodes 14 forms a substantially vertical 6×1 laser diode stack; however, it is to be understood that any suitable number of laser diodes 14 may be used, as desired and/or as suitable for a particular application. In an embodiment, the laser head 12 has an output power of about 480 Watts/6 diodes.

The term "free-spacing beam delivery" as used herein is broadly construed as meaning that the laser beams 16 are not directed through fiber optics, fiber optic bundles, or the like.

Each of the diodes 14 is adapted to generate a continuous wave laser beam 16 of a predetermined wavelength and spectral width. The laser beams 16 are adapted to weld a workpiece 18 having a first component 20 and at least one other component(s) 22 to be welded to the first component 20. The first component 20 is substantially transmissive to the predetermined wavelength; and the other component 22 is substantially absorptive of the predetermined wavelength. It is to be understood that the term "transmissive" or "substantially transmissive" as used herein is not intended to mean 100% transmissive. A material which transmits from about 75% up to about 100% of the light energy may be suitable for use in the present embodiments. Further, it is to be understood that the term "absorptive" or "substantially absorptive" as used herein is meant to mean a material which absorbs substantially all (for example about 90% of the light within about 0.2 mm of the interface 21 between components 20 and 22) of the light energy which it does not reflect.

It is to be understood that any suitable polymeric materials may be used for components 20 and 22, provided that component 20 is substantially transmissive, and component 22 is substantially absorptive. In an embodiment, the materials used for either component 20 or 22 are the following suitably modified (i.e. formulating the materials to have the desired optical properties) materials: at least one of acrylonitrilebutadiene styrene (ABS), polypropylene (PP), polyethylene terephthalate (PET), glycol modified polyethylene terephthalate (PETG), polyphenylene oxide (PPO), liquid crystal polymer (LCP), and mixtures thereof.

In an embodiment, component 20 is formed from the following materials modified to be substantially transmissive: at least one of acrylonitrilebutadiene styrene (ABS), polypropylene (PP), polyethylene terephthalate (PET), PETG, polyphenylene oxide (PPO), and mixtures thereof.

In a further embodiment, component 22 is formed from the following materials modified to be substantially absorptive: at least one of acrylonitrilebutadiene styrene (ABS), polypropylene (PP), polyethylene terephthalate (PET), polyphenylene oxide (PPO), liquid crystal polymer (LCP), and mixtures thereof.

At least one lens 17 is spaced a predetermined distance from the linear array, the lens 17 adapted to direct and/or focus laser beams 16 to at least one other lens 24 spaced a predetermined distance from the lens 17. It is to be understood that lens 17 may be any suitable lens; however, in an embodiment, lens 17 is a cylindrical focusing lens.

Lens(es) 24 are adapted to focus the laser beams 19 to substantially the same location, and, after passing through focal plane F, are adapted to shape laser beams 19 to a predetermined width and length d, thereby forming a continuous line of laser energy 15 being in a plane containing the workpiece 18. The line 15 is substantially orthogonal to a direction W (discussed further below) of translation of the workpiece 18. It is to be understood that the distance between lens 17 and the linear array, and between lens 17 and lens 24 may be any suitable distance as desired and/or as suitable for a particular application. However, in an embodiment, the distance between lens 17 and the linear array ranges from about 0.1 cm to about 10 cm; and the distance between lens 17 and lens(es) 24 ranges from about 0.1 cm to about 20 cm.

The axis A of lens(es) 24 is substantially orthogonal to the direction W of workpiece 18 translation. In an embodiment, lens 24 is a cylindrical focusing lens adapted to adjust the laser beam 19 density and substantially reduce beam divergence. Such reduction of beam divergence may be by any desired amount. In an embodiment, this beam divergence is +/−about 1 mm to about 5 mm.

Figure 7:
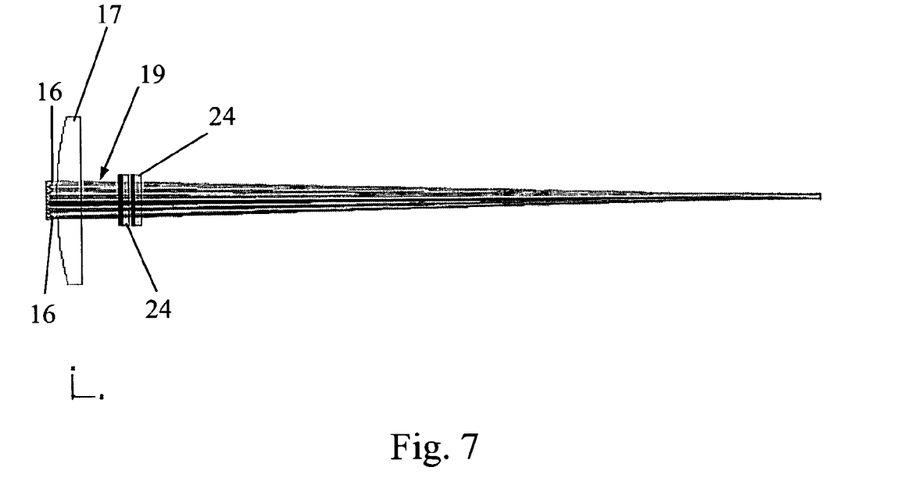
FIG. 7 is a side view showing an embodiment of a lens and an embodiment of a pair of cylindrical lenses and the laser beams traveling therethrough.
Figure 8:
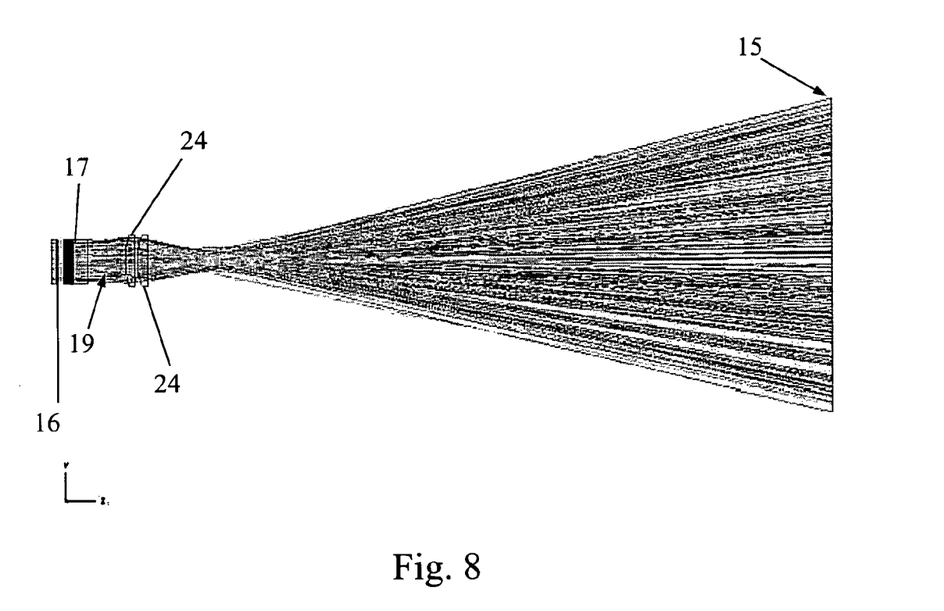
FIG. 8 is a front view of the view of FIG. 7, and rotated 90° therefrom.

In a further embodiment, lens 24 is a pair of cylindrical focusing lenses (as shown in FIGS. 7 and 8).

The continuous line of laser energy 15 is generally in a plane containing the workpiece 18, and is substantially orthogonal to a direction W of translation of the workpiece 18. As shown in FIG. 1, direction W is into/out of the page. In a further embodiment, the continuous line of laser energy 15 is in a plane containing the interface 21 between the first component 20 and the other component 22 (as shown).

The system 10 may further include a workpiece positioning member 28 and/or translating member 32, generally in conjunction with a suitable lift fixture 30 at a predetermined pressure (discussed further below), adapted to substantially continuously place consecutive adjacent areas of the workpiece 18 to be welded a predetermined distance from the laser head 12 for a predetermined period of time. The amount of time workpiece 18 is subjected to line 15 may be any suitable amount of time; in an embodiment, such time may range from about 1 second to about 50 seconds. It is to be understood that the distance from workpiece 18 to laser head 12 may be varied, as desired. In one embodiment, the distance between laser head 12 and workpiece 18 ranges between about 0.32 cm (⅛ inch) and about 25.4 cm (10 inches). In a further embodiment, the distance between laser head 12 and workpiece 18 is about 17.8 cm (7 inches). The speed at which workpiece 18 is passed under line 15 may also be any suitable speed sufficient to substantially uniformly weld components 20, 22. It is to be understood that the speed at which workpiece 18 is passed under line 15 and the number of passes may be determined by considering the following factors (among other factors): the melt point temperature of the materials used for components 20, 22 and the desired joint collapse depth. In an embodiment, such speed may range between about 8 mm/sec and about 50 mm/sec, and passes may range from about 1 to about 5. In an embodiment where the workpiece 18 is passed under line 15 twice, the speed is about 19 mm/sec.

It is to be understood that the continuous line of laser energy 15 may have any wavelength suitable to weld the materials of which components 20, 22 are formed. In an embodiment, the continuous wave (CW) wavelength of the laser beams 16 emitted by diodes 14, and thus the wavelength of line 15 ranges between about 780 nm CW and about 840 nm CW (this is the range of transmission through component 20 and absorption by component 22). In a further embodiment, this wavelength is about 808 nm CW. The spectral width of the beams 16, 19/line 15 may be less than about 10 nm. In an embodiment, the spectral width ranges from about 5 nm to about 7 nm. It has been unexpectedly and advantageously found that, by choosing materials of which components 20, 22 are formed to have relatively broad absorption, the spectral width may be relaxed to the parameters mentioned immediately above. Thus, relatively less expensive and more reliable diode lasers 14 may be used in embodiment(s) as disclosed herein.

In an embodiment, the first component 20 and the other component 22 are each formed from at least one polymeric material, provided that such material(s) are transmissive or absorptive, respectively, of the wavelength of line 15. The workpiece 18 is adapted to be welded by partially melting and softening material adjacent the interface 21 between the first component 20 and the other component 22, and allowing the materials adjacent the interface 21 to solidify, thereby forming the workpiece 18 of welded components 20, 22.

Laser welding system 10 may further include an upper pressure plate 26 (one example of which is a water cooled pressure plate 42) operatively disposed between the lens(es) 24 and the first component 20 of the workpiece 18. The water cooled pressure plate 42 will be discussed in detail below in relation to FIGS. 2 and 3.

System 10 may optionally include a feedback control mechanism C (schematically shown in FIG. 1) adapted to feed back optical power of the continuous line of laser energy 15 for controlling input power to the linear array of at least two diodes 14. In an embodiment, a beam splitter 34 reflects/diverts at least a portion of beam 19 to a suitable power monitoring device adapted to monitor the amount of light in the combined beams 19. In an embodiment, the power monitoring device is power meter 36. One example of such a beam splitter 34 is a glass member adapted to split beam 19 as described above. One example of such a diverted or split beam is about 4% of the beams 19. If power meter 36 detects a drop in output optical power from laser head 12 (if, for example, power from one of the laser diodes 14 drifts to below its specified output), the total output power of laser head 12 may be adjusted to compensate for the lessening/loss of power from one or more diodes 14.

In an alternate optional embodiment, line 15 may be visually/optically monitored (manually or automatically), and if line 15 is not of a predetermined density and/or width, the output power of laser head 12 may be adjusted as desired.

Laser welding system 10 may further include a water-cooled, heat conducting, masked pressure plate 42 operatively disposed between the lens(es) 24 and the first component 20 and adapted to selectively block transmission of the continuous line of laser energy 15, thereby substantially preventing undesired heating of the workpiece 18 (for example, in areas of the workpiece 18 where welding is undesirable).

Figure 2:
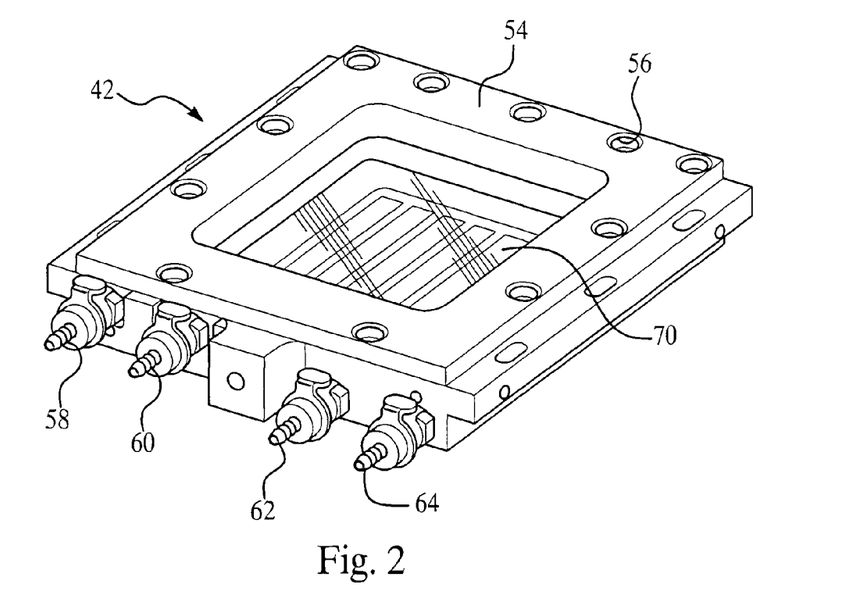
FIG. 2 is an enlarged perspective view of a water cooled masked pressure plate.
Figure 3:
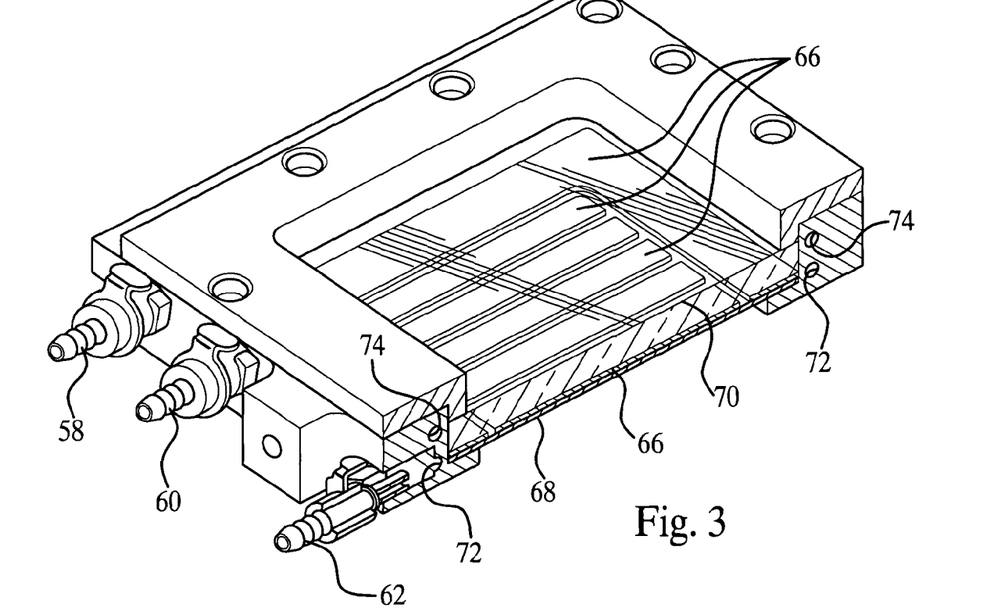
FIG. 3 is a cross sectional view of the water cooled masked pressure plate of FIG. 2.

Referring now to FIGS. 2 and 3 together, in an embodiment, the water cooled pressure plate 42 includes a frame having an interior opening therethrough and at least one water cooling passage 72, 74 within an outer periphery of the frame. It is to be understood that the frame may be formed from any suitable material and in any suitable size, shape and/or configuration. In an embodiment, the frame is formed from one or more layers of aluminum, copper, other suitably highly conductive metals, alloys thereof, and/or combinations thereof.

As shown in FIGS. 2 and 3, the frame has an upper member 54 attachable to a lower member via mounting throughbores 56, and the cooling passages 72, 74 are in the lower frame member. A first layer 68 of a substantially highly transmissive material is supported by the frame and substantially covers the interior opening, as shown. It is to be understood that "highly transmissive" or "substantially highly transmissive" as defined herein is meant to mean a material which transmits more than about 85% of the light incident upon it. Some examples of highly transmissive materials include, but are not limited to quartz, glass, clear plastics (examples of which include polycarbonate, acrylic, and/or combinations thereof), and/or combinations thereof.

A mask 66 is established in a predetermined configuration on the first layer 68 of transmissive material. It is to be understood that mask 66 may be formed of any suitable material, of any suitable thickness, and established by any suitable means, for example, by any suitable deposition techniques. In an embodiment, mask 66 ranges in thickness from about 1 micron to about 50 microns. In a further embodiment, mask 66 has a thickness of about 5 microns. It is to be understood that mask 66 may be formed of any suitable substantially non-transmissive, highly reflective material. As used herein, "highly reflective" is meant to mean a material which reflects at least 90% of the light incident upon it. Examples of such materials include, but are not limited to gold, chrome, highly polished aluminum, highly polished silver, and/or combinations thereof. The term "highly polished" is intended to mean that the material has a mirror finish. In an embodiment, the mask 66 material is gold. In a further embodiment, a layer of silver (to aid in adhesion of the gold layer) is established between the layer of gold and the first transmissive layer 68 to form mask 66.

A second layer 70 of a substantially highly transmissive material, for example quartz, may be supported by the frame and established on the mask 66/first layer 68, if desired. Second layer 70 may advantageously substantially prevent some wear of plate 42.

In an embodiment, the first 68 and second 70 layers are formed from quartz.

It is to be understood that layers 68 and 70 may be of any suitable thickness. In an embodiment, the first layer 68 of highly transmissive material ranges in thickness between about 0.1 mm and about 2.0 mm; and the second layer 70 of highly transmissive material ranges in thickness between about 3.0 mm and about 20.0 mm.

In an embodiment, the water is optionally pre-cooled before entering upper cooling water inlet 58 and/or lower cooling water inlet 64 (if more than one cooling passage is utilized). The water/chilled water (if chilled water is used) is adapted to circulate through the water cooling passage(s) 72 and/or 74, and through outlet(s) 60 and/or 62, respectively, thereby removing heat from the pressure plate 42. If chilled water is used, it may be cooled to any suitable temperature; and in an embodiment, the water is cooled to a temperature ranging between about 12° C. and about 18° C.

In an embodiment using both the upper 74 and lower 72 water cooling passages, the upper water cooling passage 74 is adapted to remove heat generated substantially in an upper region of the pressure plate 42 by absorption by the mask 66. The lower water cooling passage 72 is adapted to remove heat generated substantially in a lower region of the pressure plate 42 by contact with the workpiece 18.

A method according to the embodiment(s) herein includes lifting the first component 20 and the other component 22 against a pressure plate 26, 42; and holding the components 20, 22 together under a predetermined pressure while the workpiece positioning 28 and translating member 32 has the workpiece 18 scanned by substantially continuously placing consecutive adjacent areas of the workpiece 18 to be welded a predetermined distance from the laser head 12 for a predetermined period of time, whereby the workpiece 18 is scanned by the continuous line of laser energy 15. It is to be understood that any suitable pressure may be used as desired and depending upon the particular application. In an embodiment, the pressure may range between about 30 psi and about 90 psi. In a further embodiment, the pressure is about 60 psi.

The method further includes partially melting and bonding the first component 20 and the other component 22 at a weld interface 21 therebetween through heat produced by the continuous line of laser energy 15.

It is to be understood that workpiece 18 may be scanned one or multiple times, as desired or depending upon the particular materials used for components 20, 22 and/or depending upon the particular application. Scanning the workpiece 18 more than once may, in some instances, substantially improve uniformity of adhesion strength at the weld interface 21.

A method of using the laser welding system 10 includes setting the laser head 12 to a predetermined beam divergence, output power, operating current and/or temperature. The energy density of line 15 may be adjusted by varying the distance between the workpiece 18 and the laser head 12. The workpiece 18 may then be scanned as discussed above.

Figure 4:
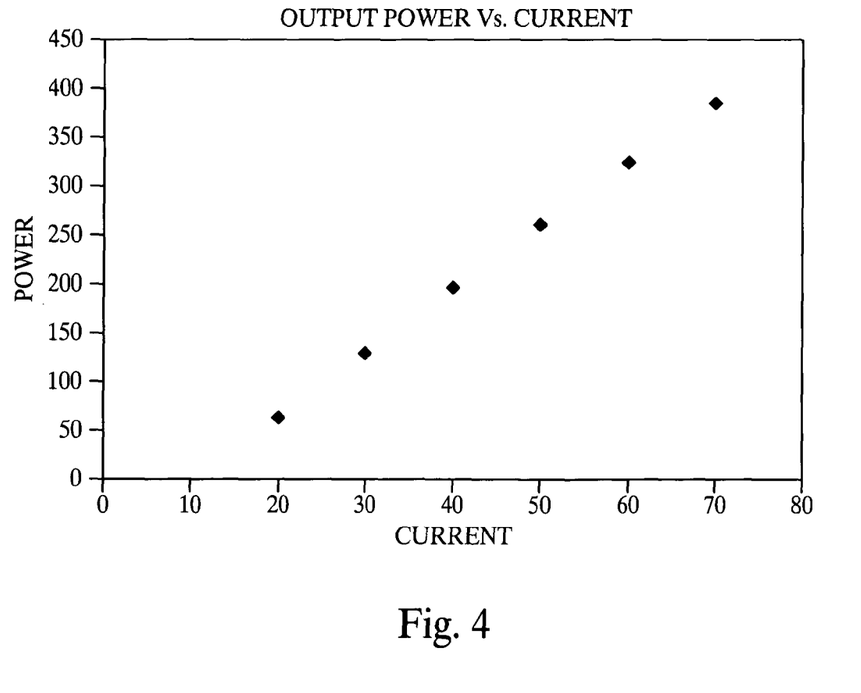
FIG. 4 is a graph showing output power versus current.

FIG. 4 is a graph depicting the output power of laser head 12 versus current in the laser welding system 10 of the present disclosure. In an embodiment, an operator and/or a computer (not shown) controlling the feedback mechanism C may use this information (graphically illustrated here) in order to determine if input power to the laser head 12 should be adjusted.

Figure 5:
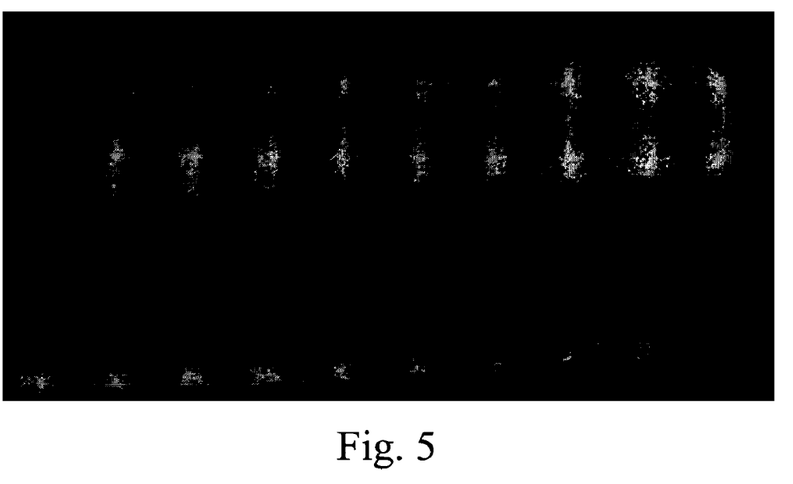
FIG. 5 is an image of two continuous lines of laser energy of varying width generated by the embodiment of FIG. 1.
Figure 6:
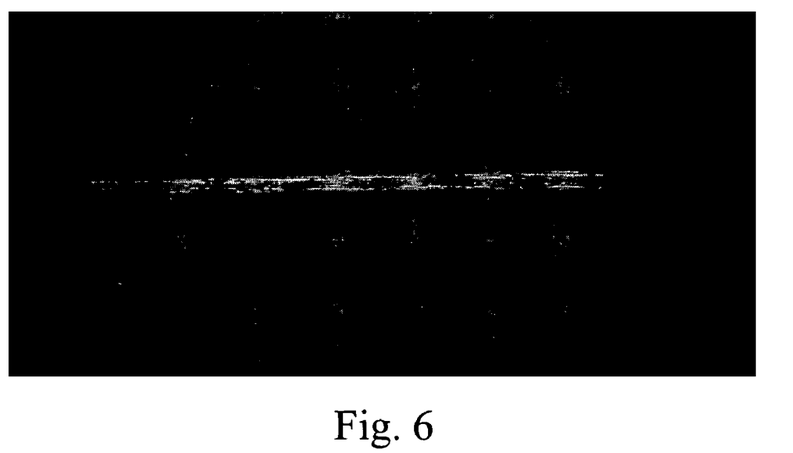
FIG. 6 is an alternate image of a continuous line of laser energy generated by the embodiment of FIG. 1.

FIG. 5 shows two images of varying width of the continuous line of laser energy 15. The continuity of the line 15 is substantially uniform. The line 15 may be varied to any suitable length d (as shown in FIG. 1) and/or width. As shown in FIG. 6, in an embodiment, the dimension of line 15 is about 8.6 cm (3.4 inches) (length d) by about 0.25 cm (0.1 inches) (thickness of line 15) at the workpiece 18 (for example, at interface 21).

Referring now to FIG. 7, there is shown a side view (taken along the fast axis of the laser beams 16), and showing an embodiment of lens 17 (for example, a cylindrical focusing lens); an embodiment of a pair of cylindrical lenses 24; as well as the laser beams 16, 19 traveling therethrough. It is to be understood that one or more additional lenses may or may not be associated with each of, or a plurality of beams 16 in advance of lens 17. In one embodiment, the beams 19 are focused to a width of about 0.42 cm (⅙ inch).

FIG. 8 is a front view of the view of FIG. 7, rotated 90° therefrom (taken along the slow axis of the laser beams 16). This view shows the beams 19 fanned out to line 15 having a desired length d (reference letter d is shown in FIG. 1).

It is to be understood that embodiment(s) of the present disclosure may have many advantages, including but not limited to those mentioned here and above. The system 10 of the present disclosure allows for a substantially uniform, homogeneous beam/line 15 on workpiece 18. This substantially homogeneous beam/line 15 aids in ensuring the substantial uniformity of the energy density along substantially the entire length d of the line. As such, the energy density along the length d of the beam/line 15 is the average of the energy of at least two (six in an embodiment) laser diodes. The system 10 further allows for real time process monitoring through controlling the total contribution of multiple laser diodes 14 instead of an individual laser 14. There is no fiber or fiber bundle/array, and little power is lost along the optical path. Further, there is lower cooling water consumption (a comparative example is 0.08 Gal/min for system 10 vs. 0.8 Gal/min for a system not embodying the present disclosure). Still further, there is lower power consumption due at least in part to fewer diodes 14 used and about 40% higher output power (compared to a fiber optic system).

While several embodiments have been described in detail, it will be apparent to those skilled in the art that the disclosed embodiments may be modified. Therefore, the foregoing description is to be considered exemplary rather than limiting.

What is claimed is:

1. A laser welding system, comprising:
   a free-spacing beam delivery laser head having a linear array of at least two laser diodes therein, each of the diodes adapted to generate a laser beam of a predetermined wavelength and spectral width, the laser beams adapted to weld a workpiece having a first component and at least one other component to be welded to the first component, the first component substantially transmissive to the predetermined wavelength, the at least one other component substantially absorptive of the predetermined wavelength;
   a lens spaced a predetermined distance from the linear array, the lens adapted to direct the laser beams to at least one other lens spaced a predetermined distance from the lens, the at least one other lens adapted to shape the laser beams to a predetermined width and length, the at least one other lens further adapted to focus the laser beams to substantially the same location, thereby forming a continuous line of laser energy being in a plane containing the workpiece, the line being substantially orthogonal to a direction of translation of the workpiece; and
   a water cooled pressure plate operatively disposed between the at least one other lens and the first component of the workpiece, wherein the water cooled pressure plate comprises:
   a frame having an interior opening therethrough and at least one water cooling passage within an outer periphery of the frame;
   a first layer of substantially transmissive material supported by the frame and substantially covering the interior opening;
   a mask established in a predetermined configuration on the first layer of substantially transmissive material; and
   a second layer of substantially transmissive material supported by the frame and established on the mask;
   wherein the pressure plate is adapted to selectively block transmission of the continuous line of laser energy, thereby substantially preventing undesired heating of the workpiece.

2. The laser welding system as defined in claim 1, further comprising a workpiece positioning and translating member adapted to substantially continuously place consecutive adjacent areas of the workpiece to be welded a predetermined distance from the laser head for a predetermined period of time.

3. The laser welding system as defined in claim 1, further comprising a feedback control mechanism adapted to feed back power of the continuous line of laser energy for controlling input power to the linear array of at least two diodes.

4. The laser welding system as defined in claim 1 wherein the linear array includes six laser diodes comprising a substantially vertical 6×1 laser diode stack.

5. The laser welding system as defined in claim 1 wherein the continuous line of laser energy is in a plane containing an interface between the first component and the at least one other component.

6. The laser welding system as defined in claim 1 wherein the lens is a cylindrical focusing lens.

7. The laser welding system as defined in claim 1 wherein the at least one other lens is a cylindrical focusing lens adapted to adjust the density of the laser beams and reduce beam divergence.

8. The laser welding system as defined in claim 1 wherein the at least one other lens is a pair of cylindrical focusing lenses.

9. The laser welding system as defined in claim 1 wherein the continuous line of laser energy has a wavelength of about 808 nm CW, and a spectral width less than about 7 nm.

10. The laser welding system as defined in claim 9 wherein the spectral width ranges from about 5 nm to about 7 nm.

11. The laser welding system as defined in claim 1 wherein the first component and the at least one other component are each formed from at least one polymeric material.

12. The laser welding system as defined in claim 1 wherein the continuous line of laser energy has a range of transmission and absorption ranging between about 780 nm and about 840 nm.

13. The laser welding system as defined in claim 1 wherein the at least one water cooling passage comprises:
  an upper water cooling passage adapted to remove heat generated substantially in an upper region of the pressure plate by absorption by the mask; and
  a lower water cooling passage adapted to remove heat generated substantially in a lower region of the pressure plate by contact with the workpiece.

14. The laser welding system as defined in claim 1 wherein the laser beams generated by the free-spacing beam delivery laser head are oriented other than parallel to the direction of translation of the workpiece.

15. The laser welding system as defined in claim 1 wherein the mask comprises a non-transmissive, highly reflective material.

16. The laser welding system as defined in claim 15 wherein the non-transmissive, highly reflective material is a layer of gold.

17. The laser welding system as defined in claim 16 wherein the frame is formed from aluminum, wherein a layer of silver is established between the layer of gold and the first transmissive layer, and wherein each of the first and second transmissive layers are formed from quartz.

18. The laser welding system as defined in claim 1 wherein chilled water is adapted to circulate through the at least one water cooling passage, thereby removing heat from the pressure plate.

19. A method of using a laser welding system, the system comprising:
  a free-spacing beam delivery laser head having a linear array of at least two laser diodes therein, each of the diodes adapted to generate a laser beam of a predetermined wavelength and spectral width, the laser beams adapted to weld a workpiece having a first component and at least one other component to be welded to the first component, the first component substantially transmissive to the predetermined wavelength, the at least one other component substantially absorptive of the predetermined wavelength;
  a lens spaced a predetermined distance from the linear array, the lens adapted to direct the laser beams to at least one other lens spaced a predetermined distance from the lens, the at least one other lens adapted to shape the laser beams to a predetermined width and length, the at least one other lens further adapted to focus the laser beams to substantially the same location, thereby forming a continuous line of laser energy being in a plane containing the workpiece, the line being substantially orthogonal to a direction of translation of the workpiece;
  a water cooled, masked pressure plate operatively disposed between the lenses and the first component of the workpiece, the water cooled, masked pressure plate comprising:
    a frame having an interior opening therethrough and at least one water cooling passage within an outer periphery of the frame;
    a first layer of substantially transmissive material supported by the frame and substantially covering the interior opening;
    a mask established in a predetermined configuration on the first layer of substantially transmissive material; and
    a second layer of substantially transmissive material supported by the frame and established on the mask;
    wherein the pressure plate is adapted to selectively block transmission of the continuous line of laser energy, thereby substantially preventing undesired heating of the workpiece;
  wherein the method comprises:
  setting the free-spacing beam delivery laser head to a predetermined beam divergence, output power, operating current, temperature and wavelength;
  measuring output power of the laser head;
  compensating for detected energy drift by increasing power to the laser head;
  adjusting density of the continuous line of laser energy by varying the distance between the workpiece and the laser head;
  holding the first component and the at least one other component together under a predetermined pressure while a workpiece positioning and translating member substantially continuously places consecutive adjacent areas of the workpiece to be welded at the distance from the laser head for a predetermined period of time, whereby the workpiece is scanned by the continuous line of laser energy; and
  removing heat from the water cooled, masked pressure plate by flowing chilled water through cooling passages defined in the pressure plate.

20. The method as defined in claim 19 wherein the laser head has an output power of about 480 Watts/6 diodes.

* * * * *